J. A. McDONAGH & J. H. REYNOLDS.
AMUSEMENT APPARATUS.
APPLICATION FILED AUG. 31, 1908.
906,732.
Patented Dec. 15, 1908.
2 SHEETS—SHEET 1.
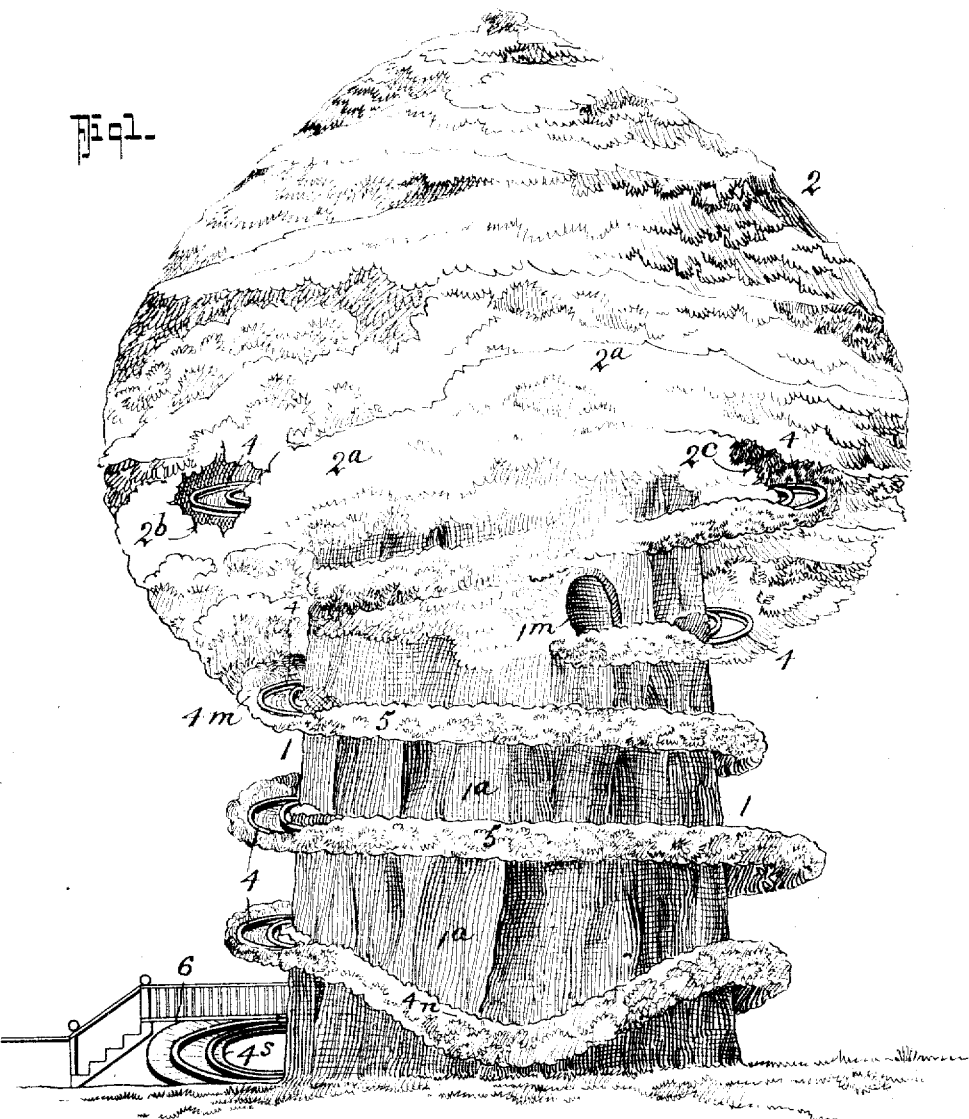
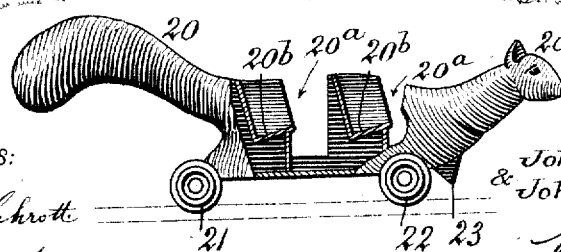
WITNESSES:
John T. Schrott
H. Woodard
INVENTORS
John A. McDonagh,
& John H. Reynolds.
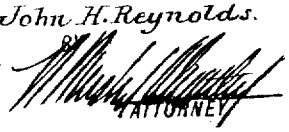
ATTORNEY J. A. McDONAGH & J. H. REYNOLDS.
AMUSEMENT APPARATUS.
APPLICATION FILED AUG. 31, 1908.
906,732.
Patented Dec. 15, 1908.
2 SHEETS—SHEET 2.
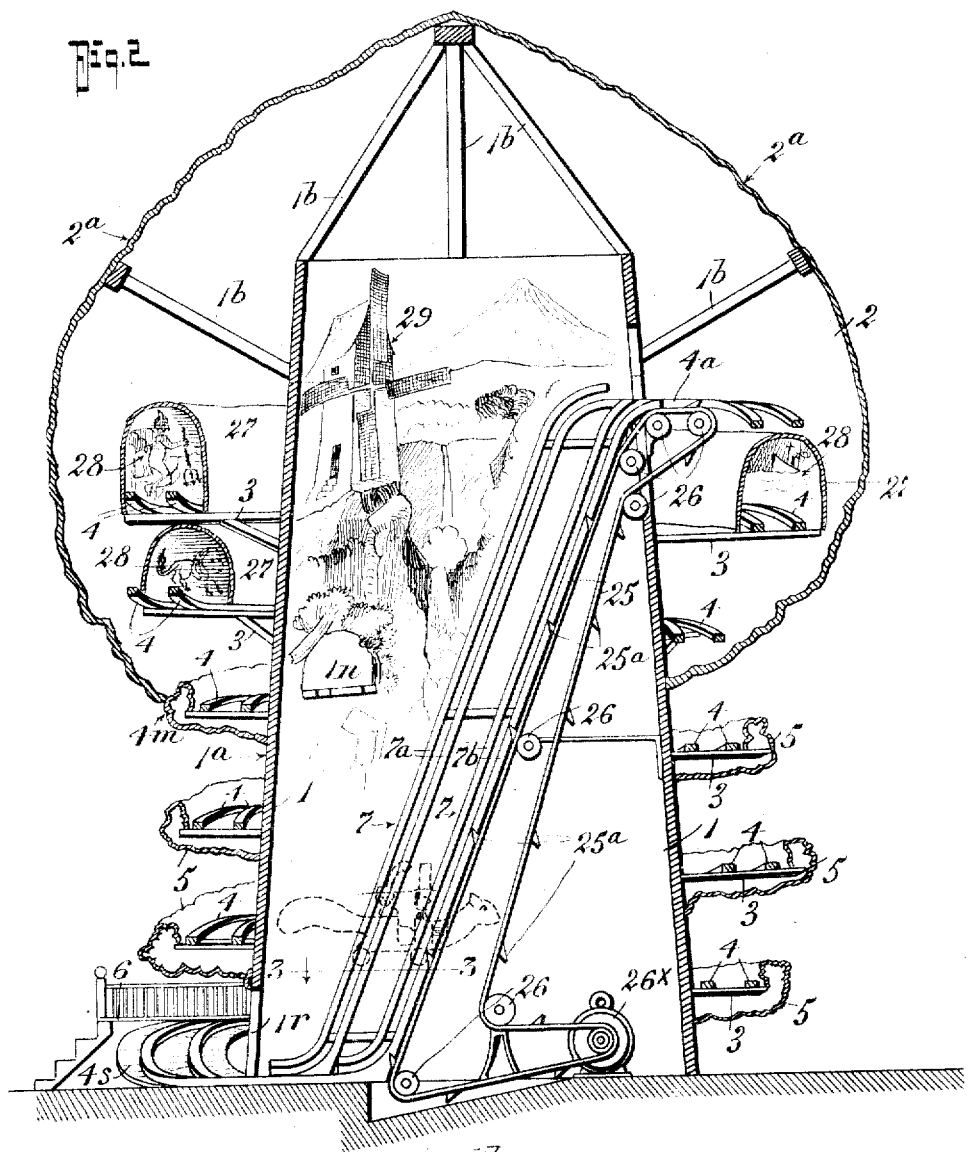
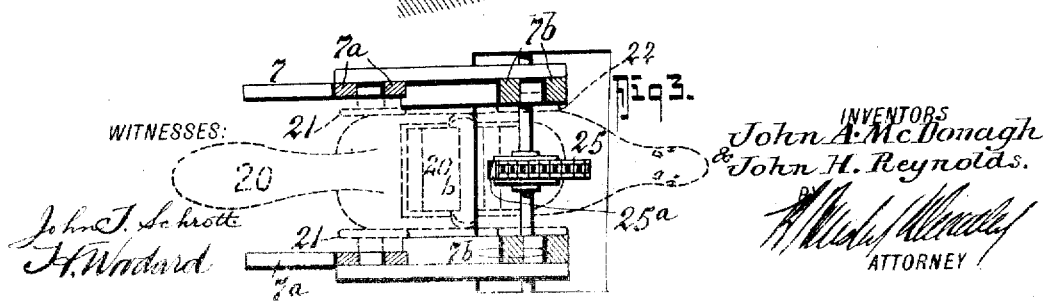
WITNESSES:
John J. Schrott
H. Windard
INVENTORS
John A. McDonagh
& John H. Reynolds
ATTORNEY

UNITED STATES PATENT OFFICE.

JOHN A. McDONAGH AND JOHN H. REYNOLDS, OF NEW YORK, N. Y.

AMUSEMENT APPARATUS.

No. 906,732.  Specification of Letters Patent.  Patented Dec. 15, 1908.

Application filed August 31, 1908.  Serial No. 451,010.

*To all whom it may concern:*

Be it known that we, JOHN A. McDONAGH and JOHN H. REYNOLDS, residing at New York, in the county of New York and State of New York, have invented certain new and useful Improvements in Amusement Apparatus, of which the following is a specification.

Our invention relates to amusement apparatus of the gravity railway class, and its primary object is to provide a structure in the shape of a tree having an inclined double-railed elevating road within the tree and a circular spiral track encircling the tree trunk.

Another object of our invention is to provide a car adapted to travel on such track, the car being in the shape of an animal, such for instance, as a squirrel, etc.

Again, our invention has for its object to provide a novel means of exhibiting scenery during the travel of the car on its track.

Generically, the invention comprises a hollow tree formed housing having an inclined double-railed track within the same, the housing having an entrance at the bottom and an exit at the top for the cars to enter the incline and leave the same, a motor operated cable, rope or chain mechanism for elevating the car from the bottom of the tree to the top thereof and a spiral track surrounding the tree trunk and within the branches thereof together with means for passing the car through the tree trunk at intervals to exhibit scenery and the like.

More specifically our invention embodies those novel details of construction, combination and arrangement of parts, all of which will be first described in detail and then be specifically pointed out in the appended claims reference being had to the accompanying drawings, in which:

Figure 1, is a side elevation of our apparatus. Fig. 2, is a central vertical longitudinal section thereof. Fig. 3, is a cross section on the line 3—3 of Fig. 2. Fig. 4, is a detail side elevation of an animal-shaped car to be used in conjunction with my device.

Referring now to the accompanying drawings, in which like letters and numerals of reference indicate like parts in all of the figures, 1, represents the trunk of the tree whose outside surface $1^a$ is made to resemble the outer surface of a tree trunk. Supported from the trunk 1 by braces $1^b$, in any suitable manner, is a supplemental housing 2 which forms the branches and foliage of the tree, the outer surfaces $2^a$ of this supplemental housing being designed and formed to resemble the outer surface and foliage of tree branches and their leaves.

Suitably supported on brackets 3, or otherwise, is a trackway 4, which commences within the casing from near the top of the trunk 1, as indicated at $4^a$, and encircles the trunk 1 within the supplemental housing or branch and foliage portion of the tree 2, as indicated, the foliage portion $2^a$ being open at intervals as at $2^b$ and $2^c$ to expose the track 4 and permit the passengers in the car 20, hereinafter again referred to, to "peep out", as it were, through the branches of the tree. The trackway 4 where it encircles the trunk 1, within the supplemental housing 2 may be formed with loop portions (not shown) similar to the loop portion $14^m$ for a purpose well understood by those skilled in the art, and the track 4 within the housing 2 passes through an opening $1^m$ into the trunk 1 of the tree and across the trunk as at $4^t$ and out through another opening $1^n$ to reverse its direction of travel around the tree trunk after it leaves the foliage portion of the tree trunk. The track 4 leaves the foliage portion at the point $4^m$ and encircles the tree trunk below the foliage portion, as shown in Fig. 1. A loop $4^n$ may be provided in the track near the end of the cars, if desired. Where the track passes around the trunk below the foliage and branch portion of the tree it may be covered by a covering 5 representing foliage or it may be made to represent a vine to encircle the tree, as shown in Fig. 1 of the drawings.

A platform 6 is provided adjacent to which the track passes whereby passengers may be admitted to the cars 20 and leave them at such point. From the platform 6 the track passes down an incline, as at $4^s$, and enters the tree trunk at the bottom through an opening $1^x$, where the track 4 merges with the double inclined track 7, shown particularly in Figs. 2 and 4 of the drawings, the double-inclined track 7 consisting of opposite pairs of spaced track rails $7^a$—$7^a$ and another pair of spaced track rails $7^b$—$7^b$. The first pair $7^a$ are to receive the rear wheels 21 of the car 20 while the other set of rails $7^b$, are to receive the front wheels 22 of the car 20, so as to maintain the car horizontally, as shown in Fig. 1, at all times.

In order that the car may automatically enter and leave the double trackway 7 the space between opposite pairs of rails 7ª—7ª and 7ᵇ—7ᵇ is arranged so that the front wheels 22 of the car will clear the track rail 7ª as the car enters onto the double trackway, as will be clearly understood by reference to Figs. 2 and 4 of the drawings.

Each car 20 is formed in the shape of an animal and provided with openings 20ª to permit the passengers to enter. The seats 20ᵇ are provided to receive the passengers.

Each car 20 may be provided with a projection 23 to coöperate with projections 25ª on an endless conveyer 25 which passes over idler pulleys 26 and extends parallel to the double track 7 so that the movement of the conveyer 25 as one of the projections 25ª engages the corresponding projection 23 of the carriage 20 will elevate the carriage from the bottom of the tree to the top and start it on the entrance end 1 of the track 4. The conveyer 25 may be of any approved construction and driven in any approved manner, an electric motor 26ˣ being indicated in the drawings for that purpose.

Tunnels 27 may be provided through which the car is adapted to pass, and suitable scenery may be exhibited in such tunnels also the interior surface of the tree trunk 1 may be provided with suitable scenery 29, as shown in Fig. 2 of the drawings.

From the foregoing description taken in connection with the accompanying drawings, it is thought the complete construction, operation and many advantages of our invention will be readily understood by those skilled in the art to which the invention appertains.

What we claim is:

1. In an amusement apparatus, a tree-formed structure having a "trunk" portion and a "branch" portion, and a railway supported on said "trunk" and "branch" portion.

2. In an amusement apparatus, a tree-formed structure having a hollow "trunk" portion and a hollow "branch" portion, an inclined railway within said "trunk" portion, and a railway merging with said inclined railway and encircling said "trunk" portion.

3. In an amusement apparatus, a tree-formed structure having a hollow "trunk" portion and a hollow "branch" portion, an inclined railway within said "trunk" portion, a railway merging with said inclined railway and encircling said "trunk" portion, said "trunk" portion having openings, and said railway passing through said "trunk" portion at said openings.

4. In an amusement apparatus, a tree-formed structure having a hollow "trunk" portion and a hollow "branch" portion, a railway supported on said "trunk" and "branch" portion, said railway including tracks encircling said "trunk" portion, and an inclined railway run from the bottom of the "trunk" portion of the structure toward the top thereof.

5. In an amusement apparatus, a tree-formed structure having a hollow "trunk" portion and a hollow "branch" portion, an endless track surrounding said "trunk" portion, said "trunk" portion having openings, said track passing through said "trunk" portion at said openings, said "branch" portion having openings to disclose such track at intervals.

6. In an amusement apparatus, a tree-formed structure having a hollow "trunk" portion and a hollow "branch" portion, an endless track surrounding said "trunk" portion, said "trunk" portion having openings, said track passing through said "trunk" portion at said openings, said "branch" portion having openings to disclose such track at intervals, cars adapted to run on said railway, said railway including an inclined railway portion extending from the bottom toward the top of said "trunk" portion of the structure, and means for elevating said cars along said inclined railway.

7. In an amusement apparatus, a tree-formed structure consisting of a hollow "trunk" and a hollow "branch" portion supported at the top of said "trunk", a double track inclined railway extending from the bottom of said "trunk" to the top thereof, cars adapted to run on said railway, and means for moving said cars along said inclined railway from the bottom to the top thereof, and a gravity railway connecting with said inclined railway at the top, and running through said "branch" portion and around said "trunk" portion of the tree-formed structure to the bottom thereof and merging with the bottom of said inclined railway.

8. In an amusement apparatus, a double track inclined railway and a separate endless conveyer coöperating therewith, of an independent car adapted to run on said railway and having front and rear pairs of wheels, one pair of wheels coöperating with one of the double tracks and the other pair of wheels coöperating with the other of the double tracks, and means for engaging the car and conveyer to move the cars along the inclined railway.

9. In an amusement apparatus, a tree-formed structure having a "trunk" portion and a "branch" portion, a railway supported on said "trunk" and "branch" portion, and scenic views supported within said "trunk" and "branches".

10. In an amusement apparatus, a tree-formed structure having a hollow "trunk" portion and a hollow "branch" portion, an inclined railway within said "trunk" portion, a railway merging with said inclined railway and encircling said "trunk" portion, and scenic views supported within said "trunk" and "branches".

11. In an amusement apparatus, a tree-formed structure having a hollow "trunk" portion and a hollow "branch" portion, an inclined railway within said "trunk" portion, a railway merging with said inclined railway and encircling said "trunk" portion, said "trunk" portion having openings, said railway passing through said "trunk" portion at intervals, and scenic views supported within said "trunk" and "branches".

12. In an amusement apparatus, a tree-formed structure having a hollow "trunk" portion and a hollow "branch" portion, a railway supported on said "trunk" and "branch" portion, said railway including tracks encircling said "trunk" portion, an inclined railway run from the bottom of the "trunk" portion of the structure toward the top thereof, and scenic views supported within said "trunk" and "branches".

13. In an amusement apparatus, a tree-formed structure having a hollow "trunk" portion and a hollow "branch" portion, an endless track surrounding said "trunk" portion, said "trunk" portion having openings, said track passing through said "trunk" portion at said openings, said "branch" portion having openings to disclose such track at intervals, and scenic views supported within said "trunk" and "branches".

14. In an amusement apparatus, a tree-formed structure having a "trunk" portion and a "branch" portion, a railway supported on said "trunk" and "branch" portion, and tunnels supported within said "branch" portion through which said track passes.

15. In an amusement apparatus, a tree-formed structure having a hollow "trunk" portion and a hollow "branch" portion, an inclined railway within said "trunk" portion, a railway merging with said inclined railway and encircling said "trunk" portion, and tunnels supported within said "branch" portion through which said track passes.

16. In an amusement apparatus, a tree-formed structure having a hollow "trunk" portion and a hollow "branch" portion, an inclined railway within said "trunk" portion, a railway merging with said inclined railway and encircling said "trunk" portion, said "trunk" portion having openings, said railway passing through said "trunk" portion at said openings, and tunnels supported within said "branch" portion through which said track passes.

17. In an amusement apparatus, a tree-formed structure consisting of a hollow "trunk" and a hollow "branch" and "foliage" portion supported over the top of said "trunk", an inclined and gravity railway mounted within and around said "trunk" and "branch" and "foliage" portions, cars operable on said railway, and means for elevating said cars along the inclined railway.

18. In an amusement apparatus, a hollow tree-formed structure consisting of a "trunk" portion and a "branch" portion supported thereon, a double track inclined railway mounted within said "trunk" portion, an endless conveyer coöperating therewith, cars adapted to run on said railway and be moved along the inclined railway from the bottom to the top by said conveyer, a gravity railway connecting said inclined railway to receive the cars at the top and conduct them around the "trunk" of the tree and through the "branch" and "foliage" portion to the bottom of the "trunk" and connect with the bottom of the inclined railway.

19. In an amusement apparatus, a hollow tree-formed structure, and an endless railway mounted thereon and passing therethrough, combined with tunnels, and means for supporting said tunnels on said tree-formed structure and over a portion of said railway.

20. In an amusement apparatus, a hollow tree-formed structure and an endless railway supported thereon and passing through the hollow structure at intervals, cars to run on said railway, said railway including an inclined portion, and means for elevating the cars along said inclined portion while maintaining their horizontal position.

21. In an amusement apparatus, a hollow tree-formed structure and an endless railway supported thereon and passing through the hollow structure at intervals, cars to run on said railway, said railway including an inclined portion, means for elevating the cars along said inclined portion while maintaining their horizontal position, and means for supporting scenery while said cars are running on said railway.

22. In an amusement apparatus, a hollow tree-formed structure consisting of a hollow "trunk" and a hollow "branch" portion, a gravity railway mounted on said "trunk" and having a portion passing through said "trunk", said gravity railway also passing through said hollow "branch" and "foliage" portion and peep-holes in said "branch" and "foliage" portion to expose said railway at intervals.

23. In an amusement apparatus, an upwardly projected tubular structure, a hood-like structure supported over the upper portion of said tubular structure and an endless track railway mounted on said tubular structure and passing in part through said hood-like structure.

JOHN A. McDONAGH.
JOHN H. REYNOLDS.

Witnesses:
A. L. N. FLEMING,
D. C. WHEARTY.